Aug. 12, 1958 F. V. ADAMS 2,847,658

DRUM STORAGE LOOK-UP DEVICE

Filed Nov. 24, 1954 2 Sheets-Sheet 1

INVENTOR.
FRANCIS V. ADAMS
BY
P. C. Henninger,
ATTORNEY

Aug. 12, 1958 F. V. ADAMS 2,847,658

DRUM STORAGE LOOK-UP DEVICE

Filed Nov. 24, 1954 2 Sheets-Sheet 2

INVENTOR.
FRANCIS V. ADAMS
BY
P. E. Henninger,
ATTORNEY

United States Patent Office 2,847,658
Patented Aug. 12, 1958

2,847,658

DRUM STORAGE LOOK-UP DEVICE

Francis V. Adams, Endicott, N. Y., assignor to International Business Machines Corporation, New York, N. Y., a corporation of New York Application November 24, 1954, Serial No. 470,881

5 Claims. (Cl. 340—174)

This invention is concerned with a look-up device for information stored on a drum. More specifically, the device employs a magnetic storage drum for containing information on separate tracks located about the periphery of the drum. The look-up device employed enables a minimum number of tracks on the drum to be searched in determining the presence or absence of given information.

In modern accounting and business machines there is employed a means for storing information, which may be in the form of a drum having a magnetic material surface and on which will be stored any desired information in the form of polarized magnetized spots on the surface of the drum. Such information is stored in the form of an address followed by a message. The address is something other than a postal address; it is a means of identification for each message, so that the various messages may be stored in a sequential order. The sequence of such storage will be determined by the address for each message. Characters of the address and message, which of course may include numbers as well as letters and other figures, are stored on the surface of the drum in the form of code groups of polarized spots. By employing electronic circuitry it is possible to have high speed operation, so that a large amount of material may be stored on a drum and the information obtained therefrom in a very rapid manner. It is necessary to employ recognizable beginning and ending field marks, before and after each address so that the difference between a group of characters representing an address and those representing a message may be recognized. In practice, drums may be employed which have large numbers of tracks with information thereon. For example, in one known machine, there are employed two drums having a total of 511 tracks on both, for the storage of information. Uses for such machines are many and no specific examples need be mentioned.

In view of the large number of tracks employed in storing information on magnetic drums, there is a problem involved in the length of time necessary to complete a search to determine the presence or absence of certain information. In overcoming this problem a system according to this invention is able to effect a search of the tracks containing information so as to eliminate a maximum number of tracks while making a completely reliable search to determine the presence or absence of a given group of information. Consequently, much searching time is saved so that a complete search may be accomplished in a fraction of a second by employing a system according to this invention.

In order to employ the system of this invention, the information that is stored on the drum or drums must be so stored in a given sequence, using the address of each message for this sequence. Then, by beginning the search at the middle track of the sequence and switching from there to the middle of two adjacent groups of tracks, the search may be rapidly narrowed down to a final track and so eliminate a large number of tracks from the search which would be needlessly included. The switching, as carried out by this invention, is continued until the track containing the desired information is found or until the search is completed without finding a correspondence of information.

Therefore, it is an object of this invention to provide a system which enables a most efficient search of a drum to be accomplished. Such a search employs the minimum number of individual tracks possible, while systematically covering the tracks on the drum without eliminating any possible locations of the desired information.

Briefly, the invention is concerned with a drum storage look-up device which may search for information that is stored in sequence on predetermined tracks on the drum. Such device comprises means for searching a minimum number of tracks in order to determine the presence or absence of certain information. Such searching means includes means for temporarily storing the certain information, also means for comparing the certain information with the sequentially stored information on the drum, and includes means for switching from one track to another in accordance with an output of the comparing means.

A specific embodiment of the invention is described below and illustrated in the drawings, in which.

It is well known that information may be stored on the surface of a drum by means of magnetically polarized spots thereon. This invention is concerned with a system for looking up information that is so stored, in a very efficient and effective manner. Groupings of characters, which may be referred to as messages, have in connection therewith a short group of characters at the beginning for identification. Such short group of characters is referred to herein as the address. In storing the information on the surface of a drum the characters that are included in each address and message are individually encoded on to the drum surface by employing groups of polarized spots. In the machine that is described in connection with this invention there is employed individual groups of six spots, which represent in a binary manner, all of the characters employed in the addresses and messages.

It is important to note that in order to employ the system according to this invention, all of the information stored on the drum must be stored in a given sequence; the sequence being determined by the information in each address, e. g. alphabetically and numerically in order, using either numbers or letters first, so long as the predetermined sequence is maintained in the sequential storage of the information.

Figures 1, 3, 4:
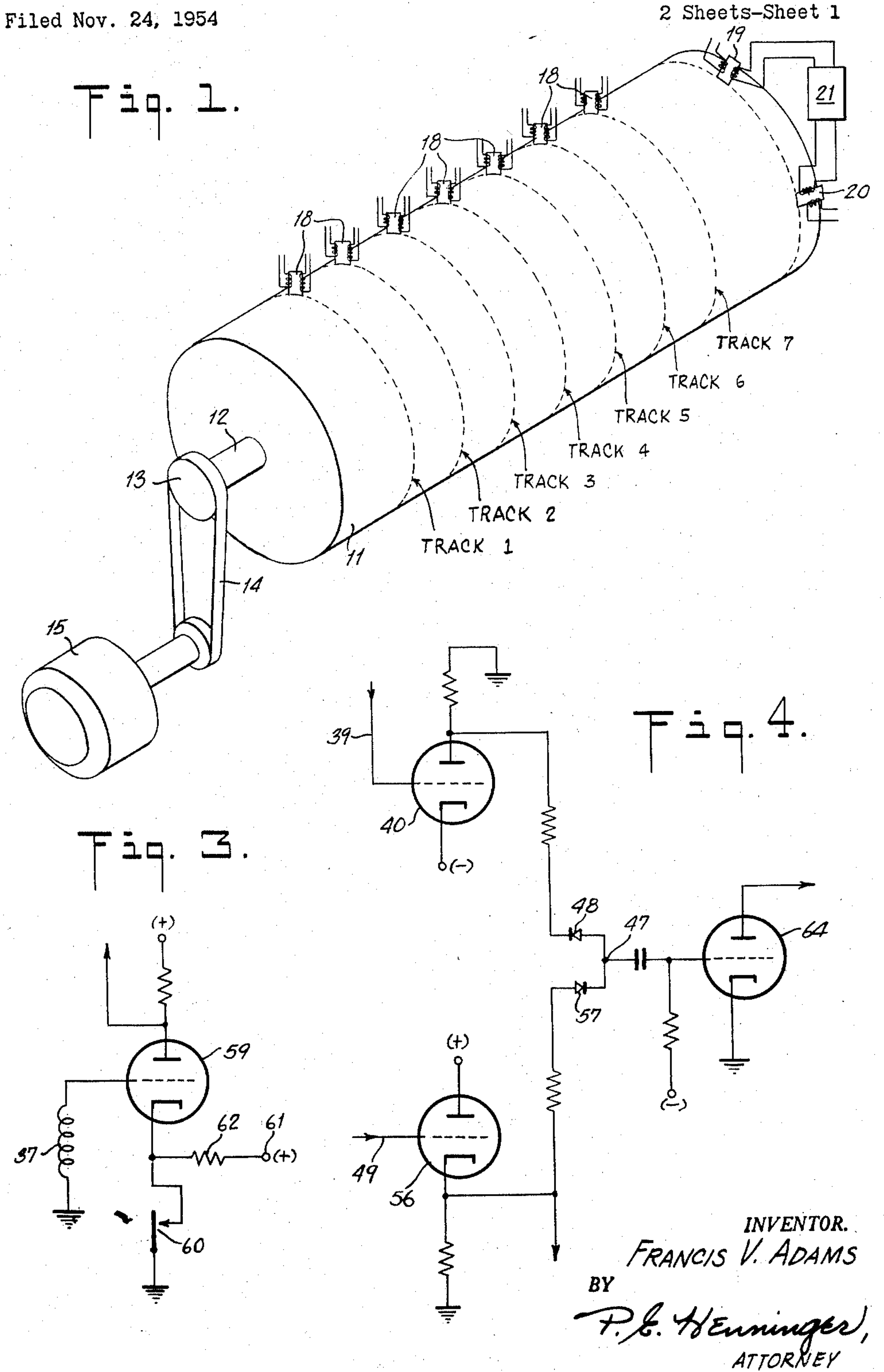
Fig. 1 is a schematic showing in perspective of a drum as employed in the system.
Fig. 3 is a detail circuit diagram illustrating one of the elements employed in Fig. 2.
Fig. 4 is another detail circuit diagram showing a basic arrangement for comparing drum and card addresses.

Assume for the purposes of illustration that the messages are stored in an ascending sequence on each track and from track to track, beginning with the track number 1 and going to track number 7, as illustrated in Fig. 1. This sequence is based on the information in the addresses only, of course. These seven tracks are located around the periphery of a magnetic storage drum 11 illustrated in Fig. 1. Drum 11 is carried by a shaft 12 and rotated at high speed in any feasible manner, e. g. by means of employing a pulley 13 and a belt 14 for connection to a motor 15. The location of the bits information on each track, on the surface of the drum 11, is not visible to the eye; but an indication of the location of each track is made by dotted lines in Fig. 1.

Longitudinally spaced along the surface of the drum 11 there is a series of read-write heads 18, one for each track on the drum. In the illustration there are two windings shown separately located on each read-write head 18, but it will be understood that the actual read-write heads employ superimposed windings thereon.

In addition, there are two other read-write heads 19 and 20 which are both located on the same track around the periphery of the drum 11. These two heads are spaced a given peripheral distance apart on the surface of the drum, such that a maximum number of characters (which can be included in any given address plus its message) may be located between the two read-write heads 19 and 20. These read-write heads 19 and 20 are electrically connected together by means of electronic circuits illustrated by a box 21. The arrangement being such that the combined read-write heads 19 and 20 and their circuitry 21 may act as a so-called "revolver" such that a certain address and message may be read into one of the heads 19 or 20, depending upon the direction of rotation of the drum 11, and then this certain message may be held temporarily stored but continuously revolving. This information is fed in at one of the heads 19 or 20 to be written on the drum and then after a complete address and message is on the drum 11 it is picked up and read out at the other of the heads 19 or 20 only to be fed back and rewritten on the drum again. The writing of information must be done on a clear track, of course. Therefore, there will be means for erasing the message after it has been read, or anytime before it is written in again. This means may be a permanent magnet or the like (not shown). Thus this information is held stored in a dynamic fashion ready for use as needed in a manner to be described below.

Figure 2:
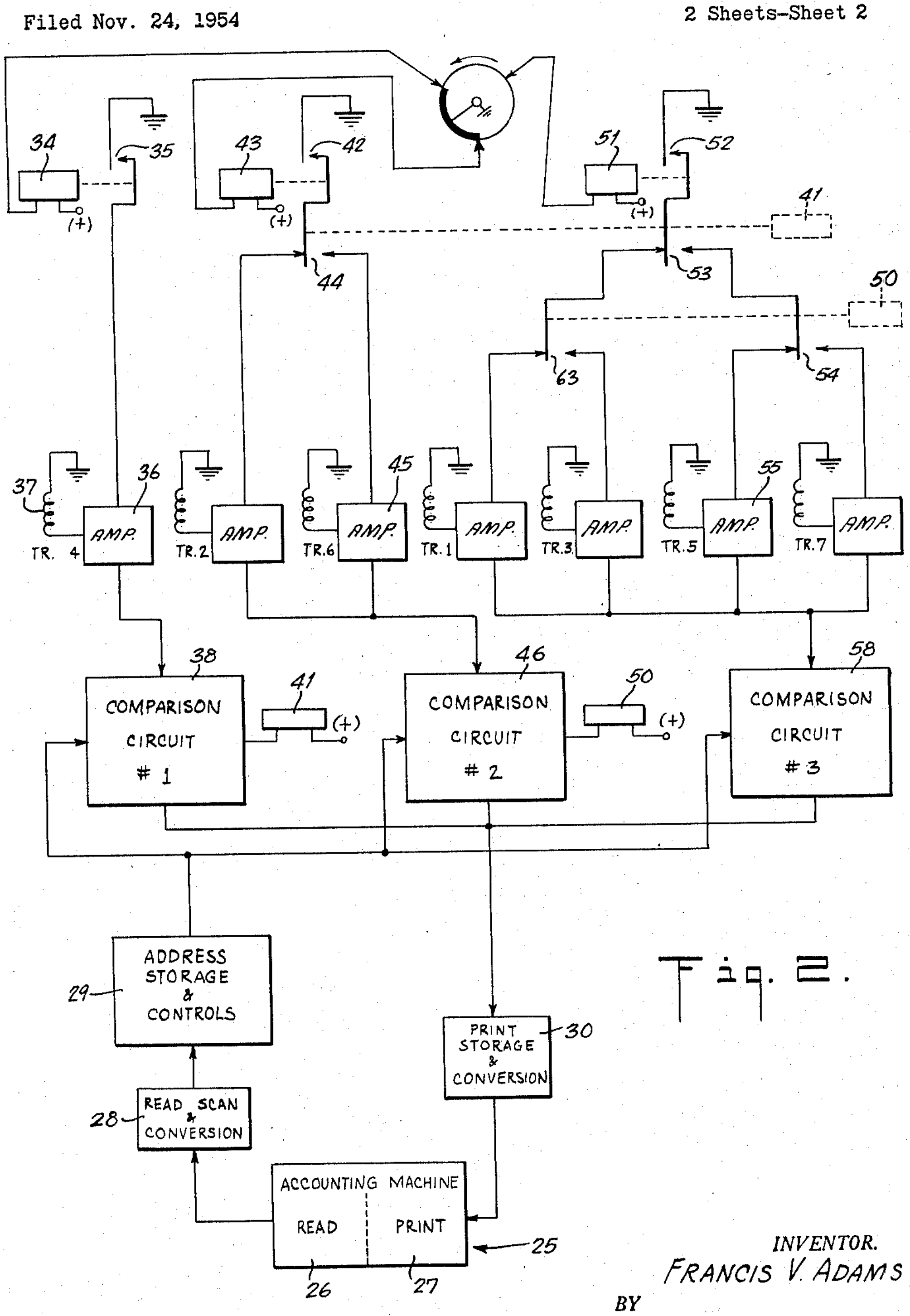
Fig. 2 is a schematic circuit diagram illustrating the electrical system.

Referring to Fig. 2, it will be observed that there is shown in block form an accounting machine 25 that is divided into two sections 26 and 27, for reading and printing information respectively. Such an accounting machine is of a well-known construction and may be a card-controlled accounting machine such as a machine known as Type 407, of the machine type numbers employed by the International Business Machines Corporation.

Following the storing of a set of information on the drum 11, a given message with its address may be looked up, and if found thereon, will be printed out at section 27 of the accounting machine 25. It is important to remember that the information as stored on the drum 11 must be stored in a given sequence as determined by the addresses in connection with each message. In making a search for a certain set of information, a card having this information encoded thereon by punched holes will be inserted in the machine 25. Thereafter, information is read out of section 26 to a scanning and conversion circuit including various electronic and electrical elements including matrices, where the code as read from the card will be converted into the same code as employed in the storage of information on the surface of drum 11. The circuitry and various elements employed in this operation are well-known in the art and form no part of this invention per se. This part of the system is indicated by a box 28 in Fig. 2.

This information as converted is fed to a temporary storage indicated by a box 29. This temporary storage involves the use of a "revolver" (like that described above in connection with Fig. 1), in order to synchronize the speed of occurrence of the pulses and code groups of pulses which represent each character, with the code groups representing these characters as read from the tracks of stored information on the drum. It will be appreciated that there are a plurality of "revolvers" employed in the system, although only one is illustrated by way of example in Fig. 1.

It is pointed out that the information in a "revolver" includes an address plus the message which follows it.

This is read into a special track on the drum 11, and (as indicated above) ordinarily only takes up a portion of the peripheral length of such tract. This address and message are then available and may be kept circulating in a revolver circuit for as long as desired. Such single address and message is in synchronism with any of the addresses and messages being read out of the storage tracks on the drum, by reason of the fact that both the address on the revolver and the address from the storage track in the drum are read out from the same drum. Thus synchronism is insured, since any change in speed, either transitory or continuous, will not affect this synchronism because any changes in reading speed of the information must be identical in each case. Furthermore, it will be clear that several revolvers (such as that illustrated in Figure 1 employing read-write heads 19 and 20) may be set up on a single track on the drum if desired. Also, additional tracks may be employed for additional revolvers as desired. When more than one revolver is used on a single track, the use of some erase means between each revolver to remove the information from the track after it passes the pick-up head of each, must be employed. The use of such erase means is obvious and no structural showing for this means has been made.

It may also be noted that the message contained in, or carried by a revolver, may be read out at any time by the use of a conventional parallel circuit with clamping on its output, so that the reading may be commenced at any character as desired. It will be clear to anyone skilled in the art that many variations in the detailed circuits are possible and it will be unnecessary to burden this disclosure with all such detailed showings.

Following a comparison of the certain information contained on the card, when a correspondence is found, the information may be sent back to the print section 27 of the accounting machine 25 via various circuit elements that are included in a box 30 marked "Print Storage+Conversion." At this portion of the system, the message is reconverted to the code employed by the accounting machine 25 and will energize the printing means included in section 27 of machine 25. During this operation it may be necessary to retain the message read out from the storage section of drum 11, until the reconversion is completed. Such retaining may be accomplished in one way, by reading it into one of the revolvers where it may be held as long as needed. In section 27 of the accounting machine the message is printed out in character form. The various circuit elements that are indicated in the blocks 29 and 30 include well-known circuit elements, both electronic and straight electrical in nature, for accomplishing the desired indicated functions, and these elements per se form no part of this invention.

In order to complete a search of the information contained on drum 11, while reading the information from a minimum number of tracks on the drum, a system such as that illustrated in Fig. 2 is employed. It will be understood that whereas only seven tracks have been illustrated herein, this is merely for the purposes of explanation of the principle involved. The invention may, of course, be carried out by employing a much greater number of tracks of information on the drum. For example, a machine embodying this invention, which has been constructed and successfully operated, uses two drums connected together and contains a total of 511 tracks having stored information thereon.

Each search to determine whether certain information is located on the drum is accomplished by beginning with a search of the information of the middle track of the sequence, i. e. track 4 of the drum 11. In order to begin this first search of track 4, a relay 34 is actuated and closes its contacts 35. This allows an amplifier 36 to pass on pulses of energy received from a winding 37 (which is the read winding on the read-write head 18 located over the track 4). Details of the amplifier 36 will be further described below in connection with Fig. 3. The coded pulses of information as passed on from amplifier 36 are led to a comparison circuit 38 that is marked "Comparison Circuit No. 1." Details of a basic circuit to be employed in comparison circuit 38 as well as in the other two comparison circuits are illustrated in Fig. 4 and described in more detail below.

It is to be noted that this comparison is made electronically and involves a "revolver" so that the pulses as read from track 4 on the drum 11 may be synchronized with, and connected in an opposing manner to the pulses contained in the revolving address and message temporarily stored in the "revolver."

A comparison will then be effected between the addresses of the certain information as read from the card being searched, and that for each of the addresses as contained on track No. 4 of the drum 11. By means of making this comparison, a control circuit for energizing or not energizing a relay 41 will be effectuated.

A basic arrangement for thus comparing the card and drum addresses is shown in Fig. 4.

Before describing the details of this circuit it should be clearly understood what the drum code consists of and the sequence of the code bits for each character. The drum code employed makes use of a binary, six bit code group for representing each character. As explained above, each bit is represented by a magnetized spot on the drum. Consequently, each character occupies six successive spaces where a spot of a given polarity is present or absent. The arrangement of the presence of the spots having the given polarity, will determine which character is represented. The following table shows the code that is employed:

| Character | Code | | | | | |
|---|---|---|---|---|---|---|
| | 0 | 1 | 2 | 3 | 4 | 5 |
| | | | | | | x |
| ? | | | | | x | |
| — | | | | | x | x |
| ( | | | | x | | |
| ) | | | | x | | x |
| + | | | | x | x | |
| / | | | | x | x | x |
| ' | | | x | | | |
| , | | | x | | | x |
| # | | | x | | x | |
| = | | | x | | x | x |
| A | | | x | x | | |
| B | | | x | x | | x |
| C | | | x | x | x | |
| D | | | x | x | x | x |
| E | | x | | | | |
| F | | x | | | | x |
| G | | x | | | x | |
| H | | x | | | x | x |
| I | | x | | x | | |
| J | | x | | x | | x |
| K | | x | | x | x | |
| L | | x | | x | x | x |
| M | | x | x | | | |
| N | | x | x | | | x |
| O | | x | x | | x | |
| P | | x | x | | x | x |
| Q | | x | x | x | | |
| R | | x | x | x | | x |
| S | | x | x | x | x | |
| T | | x | x | x | x | x |
| U | x | | | | | |
| V | x | | | | | x |
| W | x | | | | x | |
| X | x | | | | x | x |
| Y | x | | | x | | |
| Z | x | | | x | | x |
| 0 | x | | | x | x | |
| 1 | x | | | x | x | x |
| 2 | x | | x | | | |
| 3 | x | | x | | | x |
| 4 | x | | x | | x | |
| 5 | x | | x | | x | x |
| 6 | x | | x | x | | |
| 7 | x | | x | x | | x |
| 8 | x | | x | x | x | |
| 9 | x | | x | x | x | x |
| EM | x | x | | | | |
| BFM | x | x | x | | | |

The x's represent the presence of a pulse producing spot on the drum.

It will be noted that the arrangement of the pulse producing spots as representing the various characters is such that with the characters arranged in a sequential order like that given above, the presence of the spots in the group of six spot locations, occurs in a regular pattern which builds from right to left. In other words, considering the sequential order as being an ascending one from A through 9. The presence of spots begins nearest the last of the intra sequence for each group of six spots, considering the lowest end of the order, and works back to the beginning of the intra sequence for each group of six at the highest end of the order. The significance of this will be appreciated more fully below in connection with the comparison of the drum and card addresses.

For the purposes of explanation, it may be assumed that the sequence of storage of information on the drum 11 is in an ascending order beginning at track 1 and ending with track 7. The letter A being at the lower end of the order and the number 9 being at the upper end. The comparison between addresses as made in the circuit 38 will be set up so as to actuate relay 41 if the card address, as temporarily stored in address storage circuit 29, is higher in sequence than the drum address as being read from track No. 4 of the drum 11. Consequently, upon the comparison causing energization of relay 41 there is an indication that the information being searched for is higher in sequential order than the information with which it is being compared on track No. 4. Then the next step in the search is accomplished by a closing of contacts 42 of a relay 43.

In Fig. 4 it will be observed that there is an input circuit 39 for carrying pulses as read from the drum 11 and amplified in the amplifier 36, to an electron tube 40. Tube 40 acts as an inverter for the pulses and transmits them to a comparison point 47 via a rectifier 48. There is also another input circuit 49 that carries the pulses as derived from a card and transmitted from the address storage circuit 29. These pulses are passed along by a cathode follower tube 56 via another rectifier 57 to the comparison point 47. It will be noted that tube 40 is operated with a negative potential supply connected to its cathode while its plate is connected to ground through the plate resistor shown. Conversely, tube 56 is operated with a positive potential on its plate while its cathode is connected to ground through the cathode resistor shown.

This arrangement is such that when pulses are simultaneously introduced over inputs 39 and 49, the rise in the potential at point 47 due to a card pulse via tube 56 will be cancelled out, or inhibited, by the drum pulse via tube 40. However, if a card pulse appears in the absence of a drum pulse, the potential at point 47 will go positive. This will produce an output signal from a tube 64, which is connected to a "go high" relay, e. g. the relay 41. If a drum pulse should appear in the absence of a card pulse, nothing will happen because the potential of the point 47 will go negative and merely add to the already negative bias on the tube 64. The tube 64 is biased to a low or non-conducting state so that the relay that is connected thereto will not be energized unless a positive signal is received to cause the tube to become more conducting, or conducting, as the case may be.

Now it will be appreciated that when the first character of an address as derived from a card is compared with the first character of an address as read from the drum, there will be an immediate indication that the card is higher in the sequence, if this is the fact, such indication being the energization of the relay connected to the tube 64. However, if the character corresponds or is lower than that from the drum, there will be no energization of the relay connected to the tube 64, and consequently the comparison will continue with each succeeding character for the whole address. This situation repeats of course for each address on the track of the drum that is being searched. Whenever the tube 64 is energized, so as to actuate the relay connected thereto, a holding circuit (not shown) is completed to maintain the relay actuated for the remainder of a complete search.

It is pointed out that there must be a duplicate circuit, like that shown in Fig. 4, in each comparison circuit. The purpose for this duplicate circuit is to avoid a false indication that the card is higher in sequence than the drum track address. Such a false indication might easily be had if no provision were made to suppress it, because of the fact that the characters are represented by a six bit group of pulses in time sequence, as pointed out above. Take for instance the case of a card that is lower in sequence than the drum track being compared (see the code table above). Now, if the first character of the card address were "F" and the first character of the drum address being compared were "Q," the first or "0" bit is absent in each case. Then the second, or "one," bit is present in each case, so we have no output signal in the comparison circuit yet. At the third bit space (2 in the code group which is designated 0 1 2 3 4 5) the bit is absent in the card group ("F") but is present in the drum group ("Q"), and the indication is still correct, as the card is lower in the sequence than the drum track. However at the last bit space (5) there is a bit present in the "F" group (card) and no bit present in the "Q" group (drum). This last space would therefore tend to produce a signal in the tube 64 that would actuate the "go high" relay (41 or 50).

In order to avoid such false operation the drum and card character groups being compared are fed to a duplicate circuit like Fig. 4 but with the inputs reversed. In other words, the card character is fed into lead 39 and the drum character is fed into lead 49 of the duplicate circuit. Thus the presence of a drum pulse alone will produce an output signal from the tube 64, and in this case this output may be employed to cut off further operation of the comparison circuit that has its output connected to one of the "go high" relays. This may be accomplished in any convenient manner such as by connecting a clamping voltage (not shown) on to the tube 64 that is connected to the "go high" relay. This might be similar to the clamping voltage shown in connection with the drum signal amplifiers, e. g., amplifier 36 that is described in more detail below and shown in Fig. 3.

The initiation of each successive step in the search is accomplished by a timing control (not shown) which will actuate each of the relays that close the circuits for searching a given track. These relays, e. g., relays 34 and 43, are held closed sequentially for a predetermined time that is sufficient to allow the search of one track on the drum 11 to be completely searched. This time is not long, since the drum 11 rotates at high speed and only a few revolutions of the drum are necessary to complete one track search and comparison. The sequence of operation of these relays is always the same for each complete search, and is in order from left to right for the three relays 34, 43, and 51, when viewed as illustrated in Fig. 2.

When the relay 43 is energized and its contacts 42 are closed, a search will be initiated on track No. 6 assuming the first comparison as made in the circuit 38 indicated that the card information was higher in the sequence and therefore caused the energization of relay 41. The information from track No. 6 will be thus chosen because contacts 44 have been shifted to the opposite position from that illustrated in Fig. 2, due to the energization of the relay 41.

Therefore, an amplifier 45 will transmit the pulses of information as received from track No. 6 to a comparison circuit 46 which is marked "Comparison Circuit No. 2." Here a similar comparison will be made between the temporarily stored address of the card message being searched for, and the addresses as contained on track No. 6. The comparison of the first of the addresses that is picked up from the read-write head 18 on track No. 6 (and synchronized with the temporarily stored address from the card being searched) will be made. Then assuming that the comparison indicates that the card address is lower in the sequence than the drum track addresses, a relay 50 will not be energized and its contacts will not be shifted from the position illustrated.

It will be observed that the search has now been narrowed down in two steps to a single track where the information being searched for must be found if it is located on the drum at all. The searching of this final track on the drum takes place after a relay 51 is energized, closing its contacts 52. A circuit will then be completed via contacts 53 of the relay 41. Contacts 53 will be in the opposite position from that illustrated in Fig. 2, since relay 41 has been energized and will hold throughout a complete search operation. Then this circuit is completed via contacts 54 of the relay 50. Contacts 54 will be in the position illustrated, so that the circuit will be completed to an amplifier 55 that is in circuit with the read-write head located on track No. 5. In this manner the final track searched will be compared in a comparison circuit 58 that is marked "Comparison Circuit No. 3."

In each case the comparisons, as they are effected, are led out to the print storage and conversion section 30 of the system so that when the comparison indicates no difference, a circuit may be effected to cause a reading into print storage and conversion section 30 of the system. From there, following a conversion, the address and message will be printed out in the print section 27 of the machine 25. The circuit for leading out the compared address from each comparison circuit is generally indicated by an output lead 65 shown in the basic circuit of Fig. 4.

It is pointed out that a typical circuit for each of the amplifiers 36, 45 and 55, as well as those not designated by reference numbers (which are employed with each of the seven tracks), are illustrated in Fig. 3. It may be observed that there is an electronic tube 59 that has switch contacts 60 in the cathode circuit thereof. Contacts 60 correspond to the relay contacts 35, 42 and 52 in each case. The read coil 37 (which may be any one of the read coils on read-write heads 18), is connected directly into the grid circuit for tube 59 to apply the coded pulses as read from the drum, to the amplifier tube 59. It is to be noted, however, that the pulses, as generated in the coil 37, will not be passed on by the tube 59 if contacts 60 are open. This is because a high positive voltage source is connected to a terminal 61 and is connected to the cathode of tube 59 via a resistor 62. This arrangement is such that so long as contacts 60 are open, the high positive source connected to terminal 61 is applied to the cathode of tube 59 so that no current may pass therethrough, and the tube 59 is effectually cut off. Whereas, when contacts 60 are closed, the cathode of tube 59 is connected directly to ground and the tube 59 may function in the usual manner to amplify and pass on signals as received on the grid thereof from the winding 37.

In a similar manner the comparison circuit shown in Fig. 4 may be employed in each of the comparison circuit blocks 38, 46 and 58. In the block 58 there is no relay to be energized by the tube 64, but this circuit may be employed in the print storage arrangement to determine a lack of correspondence between the card and drum addresses.

It is pointed out that by employing the system as described above, a search of the drum 11 may be conducted, which begins at the middle track No. 4 and then proceeds to the middle track of one of the two adjacent groups of tracks that are on either side of track No. 4. These two middle tracks are tracks No. 2 and No. 6, so that, following the comparison which was made during the search of track No. 4, the next track to be searched will be either track No. 2 or track No. 6, depending upon whether the information that is being searched for was higher or lower in sequence than the information found on track No. 4. This procedure is carried out over and over again while narrowing down the possible location of the information by halves of the remaining possible field of location.

By way of illustration, should the search for information have been found to be lower in sequence than the information on track No. 4, track No. 2 would have been selected for the next search since relay 41 would not have been energized and contacts 44 would have directed the circuit as initiated by contacts 42 to the amplifier for track No. 2. Then, on the next step following a comparison of the information on track No. 2 with the information being searched for, it will be determined whether the address is higher or lower in sequence than that of the addresses on track No. 2. Then, for purposes of this illustration, assuming the information is found to be above that of track No. 2, the comparison will cause relay 50 to be energized and therefore the next search, as initiated by relay 51 closing its contacts 52, will be a search of track No. 3 as determined by the circuit to make the amplifier for track No. 3 effective. This circuit may be traced via contacts 52 and contacts 53 to a set of contacts 63 that will be in the opposite position from that illustrated, since relay 50 will be energized.

While a specific embodiment has been illustrated in some detail in accordance with the applicable statutes, this is not to be taken as in any way limiting the invention but merely as being descriptive thereof.

It is claimed:

1. A drum storage look-up system for seeking information that is stored in sequence within a track and as between successive predetermined tracks on the drum comprising means for skip-track searching beginning with a central track and normally continuing in a given sequential sense toward an end track to determine the presence or absence of certain information in each track searched, said searching means including means for temporarily storing said certain information, means for comparing the sequential value of said certain information with each successive value of the sequentially stored information in each searched track on said drum to determine whether the information sought is within the searched track or should be in a track toward or away from said end track with relation the currently searched track, and means responsive to each determination of said comparing means for controlling the direction of each succeeding skip-track search operation with relation to said end track.

2. A drum storage look-up system for seeking information that is stored in sequence within a track and as between successive predetermined tracks on the drum comprising means for skip-track searching beginning with a central track and progressing by successive decreasing incremental skip steps in either direction sequencewise with relation the track last searched to determine the presence or absence of certain information in each track searched, said searching means including means for temporarily storing said certain information, means for comparing the sequential value of said certain information with each successive value of the sequentially stored information in each searched track on said drum to determine whether the information sought is within the searched track or should be in a track upward or downward sequencewise with relation to the currently searched track, and means responsive to each determination of said comparing means for so controlling the direction of each succeeding skip-track search operation sequencewise as more closely to approach the sequence value of said certain information.

3. A drum storage look-up system for seeking information that is stored in sequence within a track and as between successive predetermined tracks on the drum comprising means for skip-track searching beginning with the most central track and progressing by succeeding skip steps of value equal to one-half the preceding step and in either direction sequencewise with relation the track last searched to determine the presence or absence of certain information in each track searched, said searching means including means for temporarily storing said certain information, means for comparing the sequential value of said certain information with each successive value of the sequentially stored information in each searched track on the drum to determine whether the information sought is within the searched track or should be in a track upward or downward sequencewise with relation to the currently searched track, and means responsive to each determination of said comparing means for so controlling the direction of each succeeding skip-track search operation sequencewise as more closely to approach the sequence value of said certain information.

4. A drum storage look-up system for seeking information that is stored in sequence within a track and as between successive predetermined tracks on the drum comprising an information standard of comparison, drum entry control means for entering said tracks to search beginning with a central track and progressing by successive decreasing incremental skip steps in either direction sequencewise with relation the track last searched to determine the presence or absence in a searched track of information corresponding to the value of said standard, means for comparing the value of said information standard with each successive value of the sequentially stored information appearing in each searched track on said drum to determine whether information having said information standard value is within the track searched or should be in a track located either upward or downward sequencewise with relation to the currently searched track, and means responsive to each determination of said comparing means for so controlling said drum entry control means as to enter said drum at a succeeding skip-track having a direction sequencewise with relation the last searched track as more closely to approach a sequence value corresponding to the value of said information standard.

5. An information seeking system comprising: an information source providing a standard of value against which information may be compared; means for performing an information seeking operation to derive information and for comparing the value thereof to said standard value; means responsive to inequality resulting from said comparison for performing a succeeding information seeking operation to derive, by controlled selection in a progression of incremental steps of approach, new information having information value which for each seeking operation is more closely identified to said standard value; and means responsive to substantial identity of value of the derived information with that of said standard for providing an identity indication.

References Cited in the file of this patent

A publication entitled "The Roydac System and Its External Memory," by Rehler, published in Review of Input and Output Equipment Used in Computing Systems, Joint AIEE-IRE-ACM Amputer Conference, March 1953 (pages 63–70). Copy in Div. 42.